United States Patent Office 2,874,182
Patented Feb. 17, 1959

2,874,182

N-ARALKYL-N-(ACYLOXYALKYL)-2,2-DIHALO-ALKANAMIDES AND THEIR PREPARATION

Alexander R. Surrey, Albany, N. Y., assignor to Sterling Drug Inc., New York, N. Y., a corporation of Delaware No Drawing. Application April 19, 1955
Serial No. 502,522

28 Claims. (Cl. 260—477)

This invention relates to N-aralkyl-N-(acyloxyalkyl)-2,2-dihaloalkanamides and to their preparation.

The N-aralkyl-N-(acyloxyalkyl)-2,2-dihaloalkanamides of my invention have the general formula $$Ar-X-N\begin{smallmatrix}Y-O-Ac'\\ \\Ac\end{smallmatrix}$$

where Ar is a member selected from the group consisting of (A) phenyl radicals having from one to three substituents selected from the group consisting of halo, lower alkoxy, lower alkyl, lower alkylmercapto, lower alkylsulfonyl, nitro and di(lower alkyl)amino, and (B) naphthyl, biphenylyl, furyl, pyridyl and thienyl radicals; X is a lower alklene radical having one to four carbon atoms; Y is a lower alkylene radical having two to six carbon atoms and having its two free valence bonds on different carbon atoms; Ac' is a carboxylic acyl group having from one to eight carbon atoms; and Ac is a 2,2-dihaloalkanoyl radical having two to four carbon atoms. These halogenated-alkanamides have valuable chemotherapeutic properties, for instance, amebacidal activity as evidenced by cure of hamsters infected with amebiasis.

Compounds analogous to the above, but where Ar is unsubstituted-phenyl are considerably less active than those where Ar is phenyl substituted as noted. On the other hand, while substituted-phenyl compounds are about as available as unsubstituted-phenyl compounds, for other ring systems, i. e., naphthyl, biphenylyl, furyl, pyridyl and thienyl, the substituted ring systems are relatively unavailable.

The substituents of the radical Ar as given above can be in any of the available positions of the Ar nucleus, and where more than one substituent, they can be the same or different and can be in any of the various position combinations relative to each other. The halo substituents include chloro, bromo, iodo and fluoro. The lower alkoxy, lower alkyl, lower alkylmercapto and lower alkylsulfonyl substituents, and the lower alkyl radicals of said di(lower alkyl)amino substituent, have preferably one to six carbon atoms, including such substituents as: methoxy, ethoxy, methylenedioxy, ethylenedioxy, n-propoxy, isopropoxy, isobutoxy, n-amoxy, n-hexoxy, and the like, when lower alkoxy; methyl, ethyl, n-propyl, isopropyl, n-butyl, isobutyl, 2-butyl, n-amyl, n-hexyl, and the like, when lower alkyl; methylmercapto, ethylmercapto, n-propylmercapto, isobutylmercapto, n-hexylmercapto, and the like, when lower alkylmercapto; methylsulfonyl, ethylsulfonyl, n-propylsulfonyl, isobutylsulfonyl, n-hexylsulfonyl, and the like, when lower alkylsulfonyl; and dimethylamino, ethyl-methylamino, diisobutylamino, di-n-hexylamino, and the like, when di(lower alkyl)amino.

Preferred embodiments of my invention are those N-aralkyl-N-(acyloxyalkyl)-2,2-dihaloalkanamides where Ar is a substituted-phenyl radical as described above.

The lower alkylene radical X has one to four carbon atoms, and includes such examples as

—CH$_2$—, —CH$_2$CH$_2$—

—CH(CH$_3$), —C(CH$_3$)$_2$

—CH$_2$CH$_2$CH$_2$—

—CH$_2$CH(CH$_3$)

—CH$_2$CH$_2$CH$_2$CH$_2$—

—CH$_2$CH(CH$_2$CH$_3$), —CH$_2$CH$_2$CH(CH$_3$)

and the like.

The lower alkylene radical Y has two to six carbon atoms and has its two free valence bonds on different carbon atoms, and includes such examples as —CH$_2$CH$_2$,

—CH(CH$_3$)CH$_2$—

—CH$_2$CHCH$_3$

—C(CH$_3$)$_2$CH$_2$—, —CH$_2$CH$_2$CH$_2$—

—CH$_2$CHCH$_2$CH$_3$

—CH$_2$CH$_2$CH$_2$CH$_2$—

—CH$_2$CH$_2$CH(CH$_3$), —CH$_3$CHCH$_2$CH$_2$CH$_3$

—CH$_2$CHCH$_2$CH$_2$CH$_2$CH$_3$

—CH$_2$CH$_2$CH$_2$CH$_2$CH$_2$CH$_2$— and the like.

The carboxylic acyl group Ac' has from one to eight carbon atoms, for instance, formyl, haloformyl, alkanoyl, haloalkanoyl, dihaloalkanoyl, trihaloalkanoyl, carboxyalkanoyl, di(lower alkyl)aminoalkanoyl, benzoyl, alkoxybenzoyl, carboxybenzoyl, carbalkoxybenzoyl, halobenzoyl, dihalobenzoyl, and trihalobenzoyl, and includes such examples as: acetyl (ethanoyl), butanoyl, 3-methylbutanoyl, hexanoyl, and the like, when alkanoyl; chloroacetyl, bromoacetyl, 3-iodopropanol, 2-fluorobutanoyl, and the like, when haloalkanoyl; dichloroacetyl, 2,2-dibromopropanoyl, 2-chloro-3-bromobutanoyl, and the like, when dihaloalkanoyl; tribromoacetyl, 2,2,3-trichloropropanoyl, 2,3,4-trichlorobutanoyl, 2,2-dibromo-6-chlorohexanoyl, and the like, when trihaloalkanoyl; carboxyethanoyl, 3-carboxypropanoyl, 2-carboxypropanoyl, 6-carboxyhexanoyl, and the like, when carboxyalkanoyl; diethylaminoacetyl, 2-dimethylaminopropanoyl, 4-di-n-propylaminobutanoyl, and the like, when di(lower alkyl)-aminoalkanoyl.

The 2,2-dihaloalkanoyl radical Ac has two to four carbon atoms, and includes such examples as dichloroacetyl (dichloroethanoyl), dibromoacetyl, 2,2-diiodopropanoyl, 2,2-dichloropropanoyl, 2,2-difluoropropanyl, 2,2-dichlorobutanoyl, 2-chloro-2-bromopropanoyl, and the like. The two halo substituents can be the same or different.

The compounds of my invention were prepared by reacting an N-aralkyl-N-(hydroxyalkyl)-2,2-dihaloalkanamide having the formula $$Ar-X-N\begin{smallmatrix}Y-OH\\ \\Ac\end{smallmatrix}$$

with an acylating agent selected from the group consisting of those having the formulas Ac'-halogen, (Ac')$_2$O and formic acid, where Ar, X, Y, Ac and Ac' have the meanings given above. When an acyl halide, Ac'-halogen, was used, the halide halogen, i. e., the halo radical attached to the carbonyl function was preferably chloro, however, other halo radicals, i. e., bromo, iodo and fluoro, also can be used. Illustrations of my invention are: the preparation of N-(2,4-dichlorobenzyl)-N-(2-acetoxyethyl)dichloroacetamide by reacting N-(2,4-dichlorobenzyl) - N - (2 - hydroxyethyl)dichloroacetamide with acetic anhydride; the preparation of N-(2,4-dibromobenzyl)-N-[2-(dichloroacetoxy)ethyl] - 2,2 - dichloropropanamide by reacting N-(2,4-dibromobenzyl)-N-(2-hydroxyethyl)-2,2-dichloropropanamide with dichloroacetyl chloride; and the preparation of N-(4-nitrophenethyl)-N-[2-(n-butanoyl)ethyl]-2,2-difluorobutanamide by reacting N-(4-nitrophenethyl)-N-(2-hydroxyethyl)-2,2-difluorobutanamide with n-butanoyl chloride or n-butanoic anhydride. When a halogenated-alkanoic anhydride, (Ac')$_2$O, is used, the reaction can be carried out at room temperature or higher if necessary. When a halogenated-alkanoyl halide was used the reaction was carried out preferably below room temperature, with chilling if necessary.

The intermediate N-aralkyl-N-(hydroxyalkyl)-2,2-dihaloalkanamides having the above formula were prepared by reacting an aralkylaminoalkanol of the formula, Ar-X—NH—Y—OH, with a 2,2 - dihaloalkanoylating agent selected from the group consisting of those having the formula Ac-halogen, Ac-O-(lower alkyl) and (Ac)$_2$O, where Ar, X, Y and Ac have the meanings given above. When a lower alkyl 2,2-dihaloalkanoate was used, the methyl or ethyl esters were preferred because of their ease of preparation and ready availability, however, other lower alkyl esters are satisfactory for the purpose. When a 2,2-dihaloalkanoyl halide was used, the halide halogen, i. e., the halo radical attached to the carbonyl function, was preferably chloro, however, the other halo radicals, i. e., bromo, iodo and fluoro also can be used. Illustrations of this preparation are: the preparation of N-(2,4-dichlorobenzyl) - N - (2 - hydroxyethyl)dichloroacetamide by reacting 2-(2,4-dichlorobenzylamino)ethanol with methyl dichloroacetate; the preparation of N-(2,4-dibromobenzyl) - N - (4 - hydroxybutyl) - 2,2 - dichloropropanamide by reacting 4-(2,4-dibromobenzylamino)butanol with 2,2-dichloropropanoyl chloride; and the preparation of N-(4 - nitrophenethyl) - N - (2 - hydroxypropyl)-2,2-difluorobutanamide by reacting 1-(4-nitrophenethylamino)-2-propanol with 2,2-difluorobutanoic anhydride. When a lower alkyl 2,2-dihaloalkanoate was used, the reaction was facilitated by warming the reactants on a steam bath. When a 2,2-dihaloalkanoic anhydride is used, the reaction can be carried out at room temperature or higher if necessary. When a 2,2-dihaloalkanoyl halide was used, the reaction was carried out preferably below room temperature, with cooling if necessary. Some of the intermediate N-benzyl-N-(hydroxyalkyl)-2,2-dihaloalkanamides are disclosed and claimed in my copending application Serial No. 329,447, filed January 2, 1953, now U. S. Patent 2,732,402.

The aralkylaminoalkanols of the formula

Ar-X—NH—Y—OH were prepared preferably by one of two procedures: reaction of an aralkyl halide, Ar-X-halogen, with an alkanolamine, H$_2$N—Y—OH; and, for compounds where X is CH$_2$, reaction of an aldehyde, Ar-CHO, with an alkanolamine, H$_2$N—Y—OH, and subsequent catalytical hydrogenation of the resulting anil, Ar-CH=N—Y—OH. Alternatively, a third method of preparing these aralkylaminoalkanols is the reaction of an aralkylamine, Ar-X—NH$_2$, with a haloalkanol, halogen-Y—OH.

The following examples will further illustrate specific embodiments of the invention without, however, limiting it thereto.

EXAMPLE 1

A. Aralkylaminoalkanols

As pointed out above these intermediate compounds were prepared preferably by one of two procedures: the reaction of an aldehyde with an alkanolamine and catalytic hydrogenation of the resulting anil for the preparation of compounds where X is CH$_2$; and the reaction of an aralkyl halide with an alkanolamine. Illustrations of these procedures follow.

*2 - (4 - isopropylbenzylamino)ethanol.*—A mixture of 44.3 g. of 4-isopropylbenzaldehyde and 18.3 g. of ethanolamine was heated on a steam bath in vacuo for one hour. The mixture was dissolved in 125 ml. of hot ethanol and reduced catalytically with 0.5 g. of palladium chloride and 3.5 g. of charcoal at about two atmospheres of hydrogen. After the reduction had been completed, the catalyst was filtered off and the alcohol distilled under reduced pressure. The residue which solidified was recrystallized once from n-heptane and once from ether, yielding the product, 2-(4-isopropylbenzylamino)ethanol, M. P. 80.9–83.3° C. (corr.).

*Analysis.*—Calcd. for C$_{12}$H$_{19}$NO: C, 74.55; H, 10.12. Found: C, 74.53; H, 10.16.

2 - (4 - isopropylbenzylamino)ethanol hydrochloride melted at 129.4–132.2° C. (corr.) when recrystallized from ethanol-ether.

*Analysis.*—Calcd. for C$_{12}$H$_{19}$NO.HCl: C, 62.74; H, 8.77; Cl, 15.44. Found: C, 63.00; H, 8.99; Cl, 15.62.

Other (substituted-phenyl)aminoethanols prepared by the above illustrated procedure are given in Table I.

TABLE I

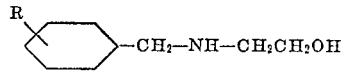

| No. | R | Base, M. P., ° C. (corr.) | Hydrochloride M. P., ° C. (corr.) |
|---|---|---|---|
| 1 | 4-OCH$_3$ | 38–39 | 112.2–113.6 |
| 2 | 4-OCH(CH$_3$)$_2$ | 75.0–76.6 | 134.9–135.4 |
| 3 | 4-OC$_2$H$_5$ | 63.0–63.6 | 103–104.6 |
| 4 | 4-OC$_3$H$_7$-n | 67–68.2 | 134.2–138.2 |
| 5 | 4-OC$_5$H$_{11}$-n | 51.9–55 | 144–145.5 |
| 6 | 3,4-O$_2$CH$_2$ | 62.6–64.4 | 152–152.6 |
| 7 | 4-OC$_4$H$_9$-n | 62.8–63.8 | 146.6–147.5 |

Analyses for the compounds of Table I are given in Table IA.

TABLE IA

| No. | Formula | Analyses (Bases) | | | |
| | | Carbon | | Hydrogen | |
| | | Calcd. | Found | Calcd. | Found |
|---|---|---|---|---|---|
| 1 | C$_{10}$H$_{15}$NO$_2$ | 66.52 | 66.66 | 8.28 | 8.74 |
| 2 | C$_{12}$H$_{19}$NO$_2$ | 68.86 | 69.84 | 9.15 | 9.27 |
| 3 | C$_{11}$H$_{17}$NO$_2$ | 67.67 | 67.90 | 8.78 | 9.09 |
| 4 | C$_{12}$H$_{19}$NO$_2$ | 68.86 | 68.75 | 9.15 | 9.10 |
| 5 | C$_{14}$H$_{23}$NO$_2$ | 70.86 | 71.66 | 9.77 | 10.20 |
| 6 | C$_{10}$H$_{13}$NO$_3$ | 61.53 | 61.60 | 6.72 | 7.03 |
| 7 | C$_{13}$H$_{21}$NO$_2$ | 69.92 | 70.73 | 9.48 | 9.23 |

The following (substituted-benzyl)aminoalkanols were prepared by the reaction of a substituted-benzyl halide with an alkanolamine.

*2-(2,4-dichlorobenzylamino)ethanol.*—78.2 g. of 2,4-dichlorobenzylchloride was added dropwise with stirring to 80 g. of ethanolamine. After standing at room temperature overnight, the mixture was basified with 20% sodium hydroxide solution and extracted with ether. Removal of the ether and recrystallization of the residue with n-heptane gave 56 g. of 2-(2,4-dichlorobenzylamino)ethanol, melting at 62–62.8° C. (corr.).

*Analysis.*—Calcd. for C$_9$H$_{11}$Cl$_2$NO: Cl, 32.22. Found: Cl, 32.43.

Alternatively, this product was obtained directly in solid form by pouring the reaction mixture into a large volume of water and stirring.

2 - (2,4 - dichlorobenzylamino)ethanol hydrochloride melted at 184.7–186.7° C. (corr.).

*Analysis.*—Calcd. for C$_9$H$_{11}$Cl$_2$NO.HCl: C, 42.12; H, 4.70; Cl, 13.80. Found: C, 42.30; H, 4.66; Cl, 13.78.

Other (substituted-benzyl)aminoalkanols prepared by the above illustrated procedure for the preparation of 2-(2,4-dichlorobenzylamino)ethanol are given in Table II.

TABLE II

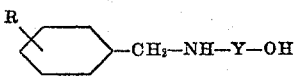

| No. | R | Y | Base, B. P., ° C. | Hydrochloride, M. P., ° C. (corr.) |
|---|---|---|---|---|
| 1 | 3,4-di-Cl | $CH_2CH_2$ | | 145.9–148.1 |
| 2 | 2-Cl | $CH_2CH_2$ | | 135.2–136.9 |
| 3 | 4-Cl | $CH_2CH_2$ | 126–131 at 0.7 mm. | 172.7–173.8 |
| 4 | 2,4-di-Cl | $CH_2CH_2CH_2$ | 150–155 at 0.5 mm. | |
| 5 | 3,4-di-Cl | $CH_2CH_2CH_2$ | 165–172 at 0.6–0.8 mm. | |
| 6 | 2,4-di-Cl | $CH_2CH(CH_3)$ | | 152.4–154.2 |

Analyses for the compounds of Table II are given in Table IIA.

TABLE IIA

| No. | Formula | Analyses (Hydrochlorides) | | | | | |
|---|---|---|---|---|---|---|---|
| | | Carbon | | Hydrogen | | Chloride | |
| | | Calcd. | Found | Calcd. | Found | Calcd. | Found |
| 1 | $C_9H_{11}Cl_2NO \cdot HCl$ | 42.13 | 42.26 | 4.71 | 4.54 | 13.82 | 12.93 |
| 2 | $C_9H_{12}ClNO \cdot HCl$ | 48.68 | 48.56 | 5.90 | 6.07 | 15.97 | 15.76 |
| 3 | $C_9H_{12}ClNO \cdot HCl$ | [Nitrogen: Calcd., 6.30; Found, 6.23] | | | | ᵃ 31.92 | ᵃ 31.96 |
| 4 | $C_{10}H_{13}Cl_2NO$ | [Base ᵇ—Nitrogen: Calcd., 5.99; Found, 6.00] | | | | | |
| 5 | $C_{10}H_{13}Cl_2NO$ | [Base ᶜ—Nitrogen: Calcd., 5.99; Found, 6.11] | | | | | |
| 6 | $C_{10}H_{13}Cl_2NO$ | [Base—Nitrogen: Calcd., 5.99; Found, 5.95] | | | | | |

ᵃ Total chlorine.
ᵇ $n_D^{25} = 1.5600$.
ᶜ $n_D^{25} = 1.5539$.

Other aralkylaminoalkanols can be prepared according to the procedures given above using the appropriate aldehyde or aralkyl halide and alkanolamine; such compounds include 2-(2,4-dibromobenzylamino)ethanol, 2-(3,4 - diiodobenzylamino) - ethanol, 2 - (4 - fluorophenethylamino)ethanol, 2 - [4 - (2,4 - dichlorophenyl)-butylamino]ethanol, 2 - (2,4 - dichlorophenethylamino)-ethanol, 2 - (3,4,5 - trichlorobenzylamino)ethanol, 2 -(4 - bromo - 2 - chlorobenzylamino)ethanol, 4 - (2,4 -difluorobenzylamino)butanol, 2 - (4 - n - hexoxybenzyl-amino)ethanol, 2 - (4 - isobutoxybenzylamino)ethanol, 6 - [2 - (3,4,5 - trimethoxyphenyl)ethylamino]hexanol, 2 - (4 - isobutylbenzylamino)ethanol, 2 - (4 - n - amylbenzylamino)ethanol, 2 - (4 - n - hexylbenzylamino)-ethanol, 6 - (4 - nitrobenzylamino)hexanol, 1 - (4-nitrobenzylamino) - 2 - propanol, 3 - (4 - nitrobenzyl-amino)propanol, 2 - (4 - n - butylmercaptobenzyl-amino)ethanol, 2 - (4 - n - isobutylsulfonylbenzyl-amino)ethanol, 1 (4 - n - butylbenzylamino) - 2 -propanol, 1 - (4 - diethylaminobenzylamino) - 2 -butanol, 3 - (4 - isopropylbenzylamino)propanol, 2 -(1 - naphthylmethylamino)ethanol, 2 - (1 - biphenylylmethylamino)ethanol, 2 - (2 - furylmethylamino)ethanol, 2 - (2 - thienylmethylamino)ethanol, 2 - (3 - pyridylmethylamino)ethanol, and the like.

An illustration of an alternative method of preparing the intermediate aralkylaminoalkanols is the reaction of 2-(3,4-dimethoxyphenyl)ethylamine with ethylene chlorohydrin to form 2-[2-(3,4-dimethoxyphenyl)ethylamino]-ethanol.

B. *N-aralkyl-N-(hydroxyalkyl)-2,2-dihaloalkanamides*

The preparation of these compounds is illustrated by the preparation of N-(3,4-dichlorobenzyl)-N-(2-hydroxyethyl)dichloroacetamide, as follows: A solution of 4 g. of dichloroacetyl chloride in 30 ml. of ethylene dichloride was added dropwise with stirring and cooling to a solution of 12 g. of 2-(3,4-dichlorobenzylamino)ethanol in 100 ml. of ethylene dichloride. The temperature was maintained below 24° C., preferably at about 0° to —5° C. by cooling with an ice-salt bath. After the addition had been completed, the reaction mixture was allowed to warm up to room temperature with stirring. The 2-(3,4-dichlorobenzylamino)ethanol hydrochloride which separated was removed by filtration and the filtrate was washed with 1 N hydrochloric acid, then water, and dried over anhydrous calcium sulfate. After distilling the ethylene dichloride under reduced pressure, the residue was triturated with ether to give 5.5 g. of the product, N-(3,4-dichlorobenzyl) - N - (2 - hydroxyethyl)dichloroacetamide, M. P. 99.4–101.5° C. (corr.) when recrystallized from a benzene-n-pentane mixture.

*Analysis.*—Calcd. for $C_{11}H_{11}Cl_4NO_2$: Cl, 42.84; C, 39.89; H, 3.35. Found: Cl, 42.68; C, 39.70; H, 3.65.

When the above procedure is followed but using diiodoacetyl chloride, difluoroacetyl fluoride or bromochloroacetyl chloride, in place of dichloroacetyl chloride, the following respective compounds result: N-(3,4-dichlorobenzyl) - N - (2 - hydroxyethyl)diiodoacetamide, N - (3,4 - dichlorobenzyl) - N - (2 - hydroxyethyl)difluoroacetamide or N-(3,4-dichlorobenzyl)-N-(2-hydroxyethyl)bromochloroacetamide.

Other N-(substituted-benzyl)-N-(hydroxyalkyl)dihaloacetamides prepared according to the above procedure are given in Table III.

TABLE III

| No. | R | Y | Halogen | M.P., ° C. (corr.) |
|---|---|---|---|---|
| 1 | 2,4-di-Cl | $CH_2CH_2$ | Cl | 112.4–113.4 |
| 2 | 4-Cl | $CH_2CH_2$ | Cl | 94.4–97.2 |
| 3 | 4-$OC_2H_5$ | $CH_2CH_2$ | Cl | 76.9–79.1 |
| 4 | 4-$C_3H_7$-i | $CH_2CH_2$ | Cl | 84.5–85.5 |
| 5 | 3,4-$O_2CH_2$ | $CH_2CH_2$ | Cl | 101.9–103.4 |
| 6 | 4-$NO_2$ | $CH_2CH_2$ | Cl | 132.2–133.6 |
| 7 | 4-$OC_4H_9$-n | $CH_2CH_2$ | Cl | 88–88.9 |
| 8 | 2,4-di-Cl | $CH_2CH_2$ | Br | 115.0–117.2 |
| 9 | 2,4-di-Cl | $CH_2CH(CH_3)$ | Cl | 135.1–138 |
| 10 | 3,4-di-Cl | $CH_2CH(CH_3)$ | Cl | 120.0–121.8 |
| 11 | 2-Cl | $CH_2CH_2$ | Cl | 76.6–79.3 |
| 12 | 3,4-di-Cl | $CH_2CH_2CH_2$ | Cl | 91.9–97.5 |
| 13 | 2,4-di-Cl | $CH_2CH_2CH_2$ | Cl | 83.7–86.7 |
| 14 | 3,4-di-Cl | $CH_2CH_2$ | Br | 115.5–128.8 |
| 15 | 3,4-di-$OCH_3$ | $CH_2CH_2$ | Cl | 116.6–117.7 |

Analyses for the compounds of Table III are given in Table IIIA.

TABLE IIIA

| No. | Formula | Analyses | | | | | |
|---|---|---|---|---|---|---|---|
| | | Carbon | | Hydrogen | | Chlorine | |
| | | Calcd. | Found | Calcd. | Found | Calcd. | Found |
| 1 | $C_{11}H_{11}Cl_4NO_3$ | 39.89 | 40.20 | 3.35 | 3.70 | 42.84 | 42.95 |
| 2 | $C_{11}H_{12}Cl_3NO_2$ | 44.54 | 44.63 | 4.07 | 4.30 | 35.87 | 35.82 |
| 3 | $C_{13}H_{17}Cl_2NO_3$ | 50.99 | 51.26 | 5.60 | 5.66 | 23.16 | 23.18 |
| 4 | $C_{14}H_{19}Cl_2NO_2$ | 55.27 | 55.17 | 6.30 | 6.49 | 23.31 | 23.07 |
| 5 | $C_{12}H_{13}Cl_2NO_4$ | 47.08 | 47.09 | 4.28 | 4.39 | 23.17 | 22.89 |
| 6 | $C_{11}H_{12}Cl_2N_2O_4$ | 43.02 | 43.22 | 3.91 | 4.15 | 23.00 | 23.01 |
| 7 | $C_{15}H_{21}Cl_2NO_3$ | 53.90 | 53.57 | 6.33 | 6.44 | 21.22 | 21.47 |
| 8 | $C_{11}H_{11}Br_2Cl_2NO_2$ | 31.46 | 31.43 | 2.64 | 2.85 | a 38.07 | a 37.75 |
| 9 | $C_{12}H_{13}Cl_4NO_3$ | 41.77 | 41.56 | 3.80 | 3.97 | 41.10 | 40.66 |
| 10 | $C_{12}H_{13}Cl_4NO_2$ | 41.77 | 42.00 | 3.80 | 3.86 | b 20.55 | b 20.52 |
| 11 | $C_{11}H_{12}Cl_5NO_2$ | 44.54 | 44.41 | 4.07 | 4.32 | b 23.93 | b 23.96 |
| 12 | $C_{12}H_{13}Cl_4NO_2$ | 41.77 | 41.70 | 3.80 | 3.89 | 41.10 | 41.44 |
| 13 | $C_{12}H_{13}Cl_4NO_2$ | 41.77 | 41.69 | 3.80 | 3.88 | 41.10 | 41.23 |
| 14 | $C_{11}H_{11}Br_2Cl_2NO_2$ | 31.46 | 31.54 | 2.64 | 2.41 | a 38.07 | a 38.39 |
| 15 | $C_{13}H_{17}Cl_2NO_4$ | 48.45 | 48.54 | 5.32 | 5.16 | 22.01 | 22.14 | a Bromine.
b Readily hydrolyzable chlorine.

Other N-aralkyl-N-(hydroxyalkyl)-2,2-dihaloalkanamides that can be prepared according to the above procedure include: N-(2,4-dibromobenzyl)-N-(2-hydroxyethyl)dibromoacetamide, N-(3,4-diiodobenzyl)-N-(2-hydroxyethyl)bromochloroacetamide, N[2-(4-fluorophenyl)ethyl]-N-(2-hydroxyethyl)difluoroacetamide, N-[4-(2,4-dichlorophenyl)butyl] - N - (2-hydroxyethyl)dichloroacetamide, N-[2-(2,4-dichlorophenyl)ethyl] - N - (2-hydroxyethyl)dichloroacetamide, N-(3,4,5-trichlorobenzyl)-N-(2-hydroxyethyl)diiodoacetamide, N - (4 - bromo-2-chlorobenzyl)-N-(2-hydroxyethyl - 2,2 - dichloropropanamide, N-(2,4-difluorobenzyl)-N-(4-hydroxybutyl)-2,2-diiodopropanamide, N-(4-n-hexoxybenzyl-N-(2-hydroxyethyl)-2-bromo - 2 - chloropropanamide, N-[2-(3,4,5-trimethoxyphenyl)ethyl] - N - (6-hydroxyhexyl)-2,2-dichlorobutanamide, N-(4-n-hexylbenzyl)-N-(2-hydroxyethyl)-2,2-dichlorobutanamide, N-(4-nitrobenzyl) - N - (3-hydroxypropyl)dibromoacetamide, N-(4-n-butylmercaptobenzyl)-N-(2-hydroxyethyl)dichloroacetamide, N-(4-isobutylsulfonylbenzyl) - N - (2-hydroxyethyl)dichloroacetamide, N-(4-n-butylbenzyl)-N-(2-hydroxypropyl)dichloroacetamide, N-(4-diethylaminobenzyl)-N-(2-hydroxybutyl)dichloroacetamide, N-(4-isopropylbenzyl)-N-(3-hydroxypropyl)dichloroacetamide, N-(1-naphthylmethyl)-N-(2-hydroxyethyl)dichloroacetamide, N-(1-biphenylylmethyl)-N-(2-hydroxyethyl)dichloroacetamide, N-(2-furylmethyl) - N - (2-hydroxyethyl)dichloroacetamide, N-(2-thienylmethyl) - N - (2-hydroxyethyl)dichloroacetamide, N-(3-pyridylmethyl)-N-(2-hydroxyethyl)dichloroacetamide, and the like.

C. *N-Aralkyl-N-[(halogenated-acyloxy)alkyl] - 2,2 - dihaloalkanamides*

The preparation of these compounds is illustrated by the preparation of N-(2,4-dichlorobenzyl)-N-(2-chloroacetoxyethyl)dichloroacetamide, as follows: 12 g. of pyridine was added dropwise with stirring and cooling to a solution of 17 g. of chloroacetyl chloride in 300 ml. of benzene. To the resultant slurry was added 33.1 g. of N-(2,4-dichlorobenzyl)-N-(2-hydroxyethyl)dichloroacetamide and stirring was continued for twelve hours. A small quantity of water soluble material was filtered off and discarded. The benzene filtrate was evaporated in vacuo leaving a heavy oily material, which was triturated respectively with water, dilute hydrochloric acid and dilute sodium hydroxide. After the trituration procedures there remained 34 g. of a solid material which was recrystallized once from isopropanol, with charcoaling, and twice from ethanol-water. The resultant product, N-(2,4-dichlorobenzyl) - N - (2-chloroacetoxyethyl)dichloroacetamide, melted at 72.1–75.5° C. (corr.).

*Analysis.*—Calcd. for $C_{13}H_{12}Cl_5NO_3$: C, 38.29; H, 2.97; $Cl_{KOH}$, 26.08. Found: C, 38.39; H, 2.86; $Cl_{KOH}$, 25.35.

$Cl_{KOH}$ means hydrolyzable chlorine as determined by hydrolysis with potassium hydroxide followed by gravimetric or amperometric analysis.

Other N-(substituted-benzyl)-N-[(halogenated-acyloxy)-ethyl]dichloroacetamides prepared according to the above procedure are given in Table IV.

TABLE IV

R—⟨phenyl⟩—CH₂—N(CH₂CH₂—O—Ac′)(COCHCl₂)

| No. | R | Ac′ | M. P., ° C. (corr.) |
|---|---|---|---|
| 1 | 2,4-di-Cl | $COCH_2CH_2Cl$ | 68.2–69.7 |
| 2 | 4-$NO_2$ | $COCH_2Cl$ | 117.2–118.0 |
| 3 | 2,4-di-Cl | $COCHCl_2$ | 88.4–90.0 |
| 4 | 4-$CH(CH_3)_2$ | $COCHCl_2$ | 110.5–111.5 |
| 5 | 4-$O(CH_2)_3CH_3$ | $COCHCl_2$ | 76.4–77.9 |
| 6 | 2,4-di-Cl | $COCCl_3$ | 96.1–97.2 |

Analyses for the compounds of Table IV are given in Table IVA.

TABLE IVA

| No. | Formula | Analysis | | | | | |
|---|---|---|---|---|---|---|---|
| | | Carbon | | Hydrogen | | Chlorine | |
| | | Calcd. | Found | Calcd. | Found | Calcd. | Found |
| 1 | $C_{14}H_{14}Cl_5NO_3$ | 39.89 | 40.07 | 3.55 | 3.18 | 25.23 | 25.35 |
| 2 | $C_{13}H_{13}Cl_3N_3O_5$ | [Nitrogen: Calcd., 7.31; Found, 7.10] | | | | 27.72 | 27.20 |
| 3 | $C_{13}H_{11}Cl_6NO_4$ | 35.32 | 35.22 | 2.51 | 2.76 | 31.70 | 31.70 |
| 4 | $C_{16}H_{19}Cl_4NO_3$ | 46.30 | 46.52 | 4.61 | 4.57 | 34.16 | 33.70 |
| 5 | $C_{17}H_{21}Cl_4NO_4$ | 45.85 | 45.74 | 4.75 | 4.82 | 31.86 | 32.00 |
| 6 | $C_{13}H_{10}Cl_7NO_5$ | 32.79 | 32.80 | 2.11 | 2.06 | 52.11 | 52.00 |

Other N-aralkyl-N-[(acyloxy)alkyl]-2,2-dihaloalkanamides that can be prepared according to the foregoing procedure using the appropriate reactants include: N-(2,4-dibromobenzyl) - N - (2-bromoacetoxyethyl)dibromoacetamide, N-(4-n-hexoxybenzyl - N - (2-iodoacetoxyethyl)-2-bromo - 2 - chloropropanamide, N-[2-(3,4,5-trimethoxyphenyl)ethyl] - N - (6-diiodoacetoxyhexyl)-2,2-dichlorobutanamide, N-(4-n-hexylbenzyl)-N-[2-(3-iodopropanoyloxy)ethyl]-2,2-dichlorobutanamide, N-(4-nitrobenzyl) - N - [3-(2,2-dichloropropanoyloxy)propyl]dibromoacetamide, N-(4-isobutylsulfonylbenzyl)-N-[2-(2,3,4 - trichlorobutanoyloxy)ethyl]dichloroacetamide, N-(4-diethylaminobenzyl) - N - [2-(2,2,3-trichlorobutanoyloxy)butyl]dichloroacetamide, N-(4-isopropylbenzyl) - N - [3-(2,2-dibromo-6-chlorohexanoyloxy)propyl]dichloroacetamide, N-(1-biphenylylmethyl) - N - (2-chloroacetoxyethyl)dichloroacetamide, N - (2 - thienylmethyl) - N - (2-dichloroacetoxyethyl)dichloroacetamide, and the like.

EXAMPLE 2

*N - aralkyl - N - (acyloxyalkyl) - 2,2 - dihaloalkanamides*

The preparation of these compounds is illustrated by the following preparation of N - (4 - isopropylbenzyl)-N - (2 - n - butanoyloxyethyl)dichloroacetamide: To a mixture of 12 g. of butanoic anhydride and 7.9 g. of pyridine was added 15.2 g. of N - (4 - isopropylbenzyl)-N - (2 - hydroxyethyl)dichloroacetamide, whereupon some heat was evolved and solution resulted. The solution was kept at room temperature for two days and then poured with stirring into a liter of water. The solid product that separated was collected, air-dried, and recrystallized twice from isopropanol and once from benzene - n - pentane. This product, N - (4 - isopropylbenzyl - N - (2 - butanoyloxyethyl)dichloroacetamide, melted at 89.9–92.0° C. (corr.).

*Analysis.*—Calcd. for $C_{18}H_{25}Cl_2NO_3$: C, 57.75; H, 6.73; Cl, 18.94. Found: C, 57.44; H, 6.45; Cl, 18.50.

N - (4 - isopropylbenzyl) - N - (2 - butanoyloxyethyl)-dichloroacetamide can also be prepared using butanoyl chloride in place of butanoic anhydride.

Other N - (substituted - benzyl) - N - (acyloxyalkyl)-dichloroacetamides prepared according to the above procedure are given in Table V.

TABLE V

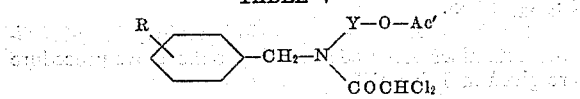

| No. | R | Y | Ac' | M.P., °C. (corr.) |
|---|---|---|---|---|
| 1 | 2,4-di-Cl | CH₂CH₂ | COCH₃ | 74.0–76.0 |
| 2 | 2,4-di-Cl | CH₂CH₂ | COCH₂CH₂CH₃ | 64.1–65.6 |
| 3 | 2,4-di-Cl | CH₂CH(CH₃) | COCH₃ | oil |
| 4 | 3,4-di-OC₂H₅ | CH₂CH₂ | COCH₃ | 72.5–74.4 |

Other N - aralkyl - N - (acyloxyalkyl) - dihaloalkanamides that can be prepared according to the foregoing procedure using the appropriate reactants include: N-(3,4 - diiodobenzyl) - N - (2 - acetoxyethyl)bromochloroacetamide, N - [2 - (4 - fluorophenyl)ethyl] - N - [2-(butanoyloxy)ethyl]difluoroacetamide, N - (3,4,5 - trichlorobenzyl) - N - [2 - (3 - methylbutanoyloxy)ethyl]-diiodoacetamide, N - (4 - bromo - 2 - chlorobenzyl) - N-[2 - (hexanoyloxy)ethyl] - 2,2 - dichloropropanamide, N - (2,4 - difluorobenzyl) - N - (4 - acetoxybutyl) - 2,2-diiodopropanamide, N - (4 - n - amylbenzyl) - N - (2-acetoxyethyl) - 2,2 - dichlorobutanamide, N - (4 - n-butylmercaptobenzyl) - N - (propanoyloxyethyl)dichloroacetamide, N - (4 - n - butylbenzyl) - N - [2 - (2,2 - dimethylpropanoyloxy)propyl]dichloracetamide, N - (1-naphthylmethyl) - N - (2 - acetoxyethyl)dichloroacetamide, N - (2 - furylmethyl) - N - (2 - acetoxyethyl)-dichloroacetamide, N - (3 - pyridylmethyl) - N - (2-acetoxyethyl)dichloroacetamide, and the like.

EXAMPLE 3

*N - aralkyl - N - (carboxyalkanoyloxyalkyl) - 2,2 - dihaloalkanamides*

The preparation of these compounds is illustrated by the following preparation of N - (2,4 - dichlorobenzyl)-N - [2 - (3 - carboxypropanoyloxy)ethyl]dichloroacetamide: To a mixture of 15 g. of succinic anhydride and 12 g. of pyridine was added 33.1 g. of N - (2,4 - dichlorobenzyl) - N - (2 - hydroxyethyl)dichloroacetamide and the resulting mixture was heated for one hour on a steam bath. The solution was allowed to stand at room temperature for two days and then washed with dilute hydrochloric acid and water. The washed solution was extracted with ethylene dichloride, the extract dried over anhydrous calcium sulfate and the solvent removed by distilling in vacuo, leaving a heavy oily material that solidified after standing one week in a refrigerator. Three recrystallizations of this solid material from ethanol-water yielded the product, N - (2,4 - dichlorobenzyl)-N - [2 - (3 - carboxypropanoyloxy)ethyl]dichloroacetamide, M. P. 95.9–96.6° C. (corr.).

*Analysis.*—Calcd. for $C_{15}H_{15}Cl_4NO_5$: $Cl_{KOH}$, 16.45; N. E., 431. Found: $Cl_{KOH}$, 16.15; N. E., 431.

Analyses for the compounds of Table V are given in Table VA.

TABLE VA

| No. | Formula | Analysis | | | | | |
|---|---|---|---|---|---|---|---|
| | | Carbon | | Hydrogen | | Chlorine | |
| | | Calcd. | Found | Calcd. | Found | Calcd. | Found |
| 1 | C₁₃H₁₅Cl₄NO₃ | 41.85 | 41.66 | 3.51 | 3.99 | 38.02 | 38.28 |
| 2 | C₁₅H₁₇Cl₄NO₃ | 44.91 | 44.73 | 4.27 | 3.87 | 17.68 | 17.84 |
| 3 | C₁₄H₁₅Cl₄NO₃ | 43.44 | 43.69 | 3.91 | 3.86 | 36.64 | 35.80 |
| 4 | C₁₇H₂₃Cl₂NO₅ | 52.05 | 51.88 | 5.91 | 5.67 | 18.08 | 17.80 |

Other N - (substituted - benzyl) - N - (acyloxyethyl)-dichloroacetamides prepared according to the above procedure are given in Table VI.

TABLE VI

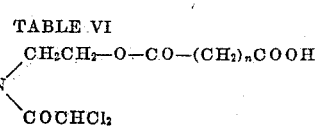

| No. | R | n | M.P., °C. (corr.) |
|---|---|---|---|
| 1 | 2,4-di-Cl | 3 | 103.9–106.7 |
| 2 | 4-CH(CH₃)₂ | 2 | 96.7–100.2 |
| 3 | 4-OC₄H₉-n | 2 | 138.1–139.4 |

Analyses for the compounds of Table VI are given in Table VIA.

TABLE VIA

| No. | Formula | Analysis | | | |
|---|---|---|---|---|---|
| | | Neutral Equivalent | | Chlorine | |
| | | Calcd. | Found | Calcd. | Found |
| 1 | $C_{16}H_{17}Cl_4NO_3$ | 445.1 | 447.4 | 31.86 | 31.33 |
| 2 | $C_{18}H_{23}Cl_2NO_5$ | 404.3 | 411.2 | 17.57 | 17.20 |
| 3 | $C_{19}H_{25}Cl_2NO_6$ | 434.3 | 429.7 | 16.33 | 16.50 |

Other N - aralkyl - N - (acyloxyalkyl) - 2,2 - dihaloalkanamides that can be prepared according to the foregoing procedure using the appropriate reactants include: N - (3,4 - dichlorobenzyl) - N - [3 - (2 - carboxypropanoyloxy)propyl]dibromoacetamide, N - [2 - (2,4 - dichlorophenyl) - N - [2 - (5 - carboxypentanoyloxy)-ethyl]dichloroacetamide, N - (4 - chlorobenzyl) - N - [2-(2 - carboxypropanoyloxy)ethyl] - 2,2 - dichloropropanamide.

EXAMPLE 4

*N - aralkyl - N - (benzoxyalkyl) - 2,2 - dihaloalkanamides*

The preparation of these compounds is illustrated by the following preparation of N - (2,4 - dichlorobenzyl)-N - [2 - (2,4 - dichlorobenzoxy)ethyl]dichloroacetamide: 31.5 g. of 2,4 - dichlorobenzoyl chloride was added with stirring and cooling (temperature <20°) to a solution of 24 g. of pyridine in 100 ml. of dioxane. Stirring of the resulting thick slurry was continued while a solution of 33.1 g. of N - (2,4 - dichlorobenzyl) - N - (2 - hydroxyethyl)dichloroacetamide in 100 ml. of dioxane was added slowly. The resulting mixture was then refluxed for six hours. On cooling, the solid which separated was broken up, filtered off and discarded. The red filtrate was poured with stirring into two liters of water and stirring was continued until the oil that separated solidified. The pink solid was collected on a filter and oven-dried at 90° C., 49 g. (98%). After recrystallization once from benzene with charcoal and once from isopropanol, the product, N - (2,4 - dichlorobenzyl) - N - [2 - (2,4 - dichlorobenzoxy)ethyl]dichloroacetamide, melted at 113.8–116° C. (corr.).

*Analysis.*—Calcd. for $C_{18}H_{13}Cl_6NO_3$: C, 42.89; H, 2.60; $Cl_{KOH}$, 14.07. Found: C, 42.57; H, 2.71; $Cl_{KOH}$, 13.82.

When the above procedure was followed using 2-carboxybenzoyl chloride in place of 2,4-dichlorobenzoyl chloride, the resulting product was N-(2,4-dichlorobenzyl)-N-[2-(2-carboxybenzoxy)ethyl]dichloroacetamide, M. P. 119.3–122.9° C. (corr.).

*Analysis.*—Calcd. for $C_{19}H_{15}Cl_4NO_5$: $Cl_{KOH}$, 14.80; N. E., 479. Found: $Cl_{KOH}$, 14.54; N. E., 473.1.

Other N-aralkyl-N-(acyloxyalkyl)-2,2-dihaloalkanamides that can be prepared according to the above procedure include: N-(3,4-dichlorobenzyl)-N-[2-(4-carboxybenzoxy)ethyl]dichloroacetamide, N-[2-(2,4-dichlorophenyl)ethyl] - N - [2 - (2 - carbethoxybenzoxy)ethyl] - 2,2 - dichloropropanamide, N-(4-chlorobenzyl)-N-[2-(4-n-butoxybenzoxy)ethyl]dibromoacetamide, and the like.

EXAMPLE 5

*N-(Substituted-benzyl)-N-(formyloxyalkyl)-2,2-dihaloalkanamides*

The preparation of formyloxy compounds, i. e., those where Ac' is

is special in that formyl halides and formic anhydride are difficult to prepare if, indeed, they can be prepared at all. However, formic acid can be used in their stead, as illustrated in the following paragraph.

A mixture of 33.1 g. of N-(2,4-dichlorobenzyl)-N-(2-hydroxyethyl)dichloroacetamide and 100 ml. of formic acid was heated on a steam bath for one hour with stirring and then poured into two liters of water with stirring. The product that separated was collected, washed with water and recrystallized three times from isopropanol. This product, N-(2,4-dichlorobenzyl)-N-(2-formyloxyethyl)dichloroacetamide, melted at 88.1–90.6° C. (corr.).

*Analysis.*—Calcd. for $C_{12}H_{11}Cl_4NO_3$: Cl, 40.14; H, 3.09; $Cl_{KOH}$, 19.55. Found: Cl, 40.04; H, 3.05; $Cl_{KOH}$, 19.45.

Other N-(substituted-benzyl)-N-(formyloxyalkyl)-2,4-dihaloacetamides prepared according to the above procedure are given in Table VII.

TABLE VII

| No. | R | M. P., °C. (corr.) |
|---|---|---|
| 1 | 4-CH(CH₃)₂ | 72.3–74.9 |
| 2 | 4-OC₄H₉-n | 69.0–70.9 |

Analyses for the compounds of Table VII are given in Table VIIA.

TABLE VIIA

| No. | Formula | Analysis | | | | | |
|---|---|---|---|---|---|---|---|
| | | Carbon | | Hydrogen | | Chlorine | |
| | | Calcd. | Found | Calcd. | Found | Calcd. | Found |
| 1 | $C_{15}H_{19}Cl_2NO_3$ | 54.22 | 54.09 | 5.76 | 5.70 | 21.34 | 21.10 |
| 2 | $C_{16}H_{21}Cl_2NO_4$ | 53.05 | 53.46 | 5.84 | 5.89 | 19.57 | 19.60 |

EXAMPLE 6

N-(2,4-Dichlorobenzyl)-N-(2-diethylaminoacetoxyethyl)dichloroacetamide

To a refluxing solution of 13.5 g. of N-(2,4-dichlorobenzyl)-N-(2-chloroacetoxyethyl)dichloroacetamide in 75 ml. of benzene was added dropwise with stirring 5.7 g. of diethylamine, and refluxing was continued for about five hours. The precipitated diethylamine hydrochloride was filtered off and the benzene filtrate was washed with water, dried and evaporated in vacuo yielding a viscous oily residue, which solidified when allowed to stand overnight in a refrigerator. Three recrystallizations of this solid from n-hexane yielded the product, N-(2,4-dichlorobenzyl) - N - (2-diethylaminoacetoxyethyl)dichloroacetamide, M. P. 61.1–63.5° C. (corr.).

*Analysis.*—Calcd. for $C_{17}H_{22}Cl_4N_2O_3$: N, 6.31; $Cl_{KOH}$, 15.96. Found: N, 6.30; $Cl_{KOH}$, 16.05.

The N-aralkyl-N-(acyloxyalkyl)-2,2-dihaloalkanamides of the foregoing examples when administered orally in aqueous suspension to hamsters infected with *Endamoeba criceti* were found to completely clear the animals of the infection at drug levels below 200 mg. per kg. of body weight. Some of the compounds, for instance, N-(2,4-dichlorobenzyl) - N - (2 - acetoxyethyl)dichloroacetamide, N - (2,4 - dichlorobenzyl) - N - [2 - (n - butanoyloxy)ethyl]dichloroacetamide, N-(2,4-dichlorobenzyl)-N-(2-formyloxyethyl)dichloroacetamide, N-(2,4-dichlorobenzyl)-N-[2-(chloroacetoxy)ethyl]dichloroacetamide, N-(2,4-dichlorobenzyl)- N - [2 -(3 - chloropropanoyloxy)ethyl]dichloroacetamide, N-(2,4-dichlorobenzyl)-N-[2-(dichloroacetoxy)ethyl]dichloroacetamide, N-(2,4-dichlorobenzyl)-N - [2 - (2,4 - dichlorobenzoxy)ethyl]dichloroacetamide, N - (4 - isopropylbenzyl) - N - (2 - dichloroacetoxyethyl)dichloroacetamide, N-(4-isopropylbenzyl)-N-[2-(n-butanoyloxy)ethyl]dichloroacetamide, N-(4-isopropylbenzyl)-N-(2-formyloxyethyl)dichloroacetamide and N-(4-n-butoxybenzyl) - N - (2 - formyloxyethyl)dichloroacetamide, have $ED_{50}$ values in the range between 3 and 15 mg. per kg. of body weight, $ED_{50}$ meaning the effective dose necessary to clear 50% of the hamsters of the amebic infection. Coupled with this outstandingly high activity, my compounds have extremely low toxicities. For example, N-(2,4-dichlorobenzyl)-N-[2-(chloroacetoxy)-ethyl]dichloroacetamide, which has an $ED_{50}$ value of 12.5 mg./kg., has an acute oral $LD_{50}$ (mice; seven-day) of 3000±400 mg./kg. and a subacute oral $LD_{50}$ (rats; five-day) of 500±80.5 mg./kg.; and N-(2,4-dichlorobenzyl)-N-[2-(n-butanoyloxy)ethyl]dichloroacetamide, which has an $ED_{50}$ value of 6.0 mg./kg., has an acute oral $ALD_{50}$ (mice) of greater than 16,000 mg./kg. The N-aralkyl-N-(acyloxyalkyl)-2,2-dihaloalkanamides of my invention also can be administered in solid form, e. g., as tablets or in capsules, and optionally admixed with conventional excipients such as starch, talc, and the like.

This application is a continuation-in-part of my copending application Serial Number 411,553, filed February 19, 1954, now abandoned.

I claim:

1. A compound having the formula

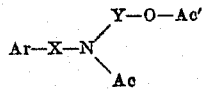

where Ar is a member selected from the group consisting of (A) phenyl radicals having from one to three substituents selected from the group consisting of halo, lower alkoxy, lower alkyl, lower alkylmercapto, lower alkylsulfonyl, nitro and di(lower alkyl)amino, and (B) naphthyl, biphenylyl, furyl, pyridyl and thienyl radicals; X is a lower alkylene radical having one to four carbon atoms; Y is a lower alkylene radical having two to six carbon atoms and having its two free valence bonds on different carbon atoms; Ac' is a carboxylic acyl group having from one to eight carbon atoms; and Ac is a 2,2-dihaloalkanoyl radical having two to four carbon atoms.

2. A compound having the formula

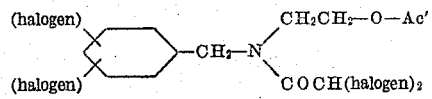

where Ac' is a carboxylic acyl group having from one to eight carbon atoms.

3. A compound having the formula

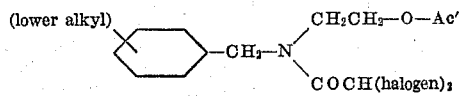

where Ac' is a carboxylic acyl group having from one to eight carbon atoms.

4. A compound having the formula

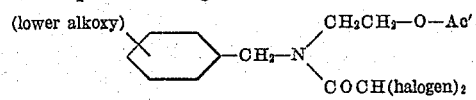

where Ac' is a carboxylic acyl group having from one to eight carbon atoms.

5. A compound having the formula

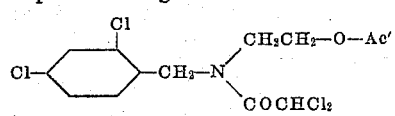

where Ac' is a carboxylic acyl group having from one to eight carbon atoms.

6. A compound having the formula

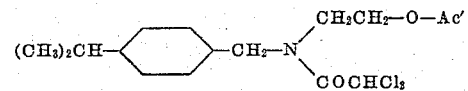

where Ac' is a carboxylic acyl group having from one to eight carbon atoms.

7. A compound having the formula

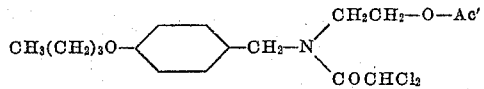

where Ac' is a carboxylic acyl group having from one to eight carbon atoms.

8. N - (2,4 - dichlorobenzyl) - N - (2 - trichloroacetoxyethyl)dichloroacetamide.

9. N - (2,4 - dichlorobenzyl) - N - (2 - chloroacetoxyethyl)dichloroacetamide.

10. N - (2,4 - dichlorobenzyl) - N - [2 - (3 - chloropropanoyloxy)ethyl]dichloroacetamide.

11. N - (2,4 - dichlorobenzyl) - N - [2 - (n - butanoyloxy)ethyl]dichloroacetamide.

12. N - (2,4 - dichlorobenzyl) - N - [2 - (2,4 - dichlorobenzoxy)ethyl]dichloroacetamide.

13. N - (2,4 - dichlorobenzyl) - N - (2 - formyloxyethyl)dichloroacetamide.

14. N - (4 - isopropylbenzyl) - N - (2 - dichloroacetoxyethyl)dichloroacetamide.

15. N - (4 - isopropylbenzyl) - N - [2 - (n - butanoyloxy)ethyl]dichloroacetamide.

16. N - (4 - isopropylbenzyl) - N - (2 - formyloxyethyl)dichloroacetamide.

17. N - (4 - n - butoxybenzyl) - N - (2 - formyloxyethyl)dichloroacetamide.

18. A process for the preparation of a compound having the formula

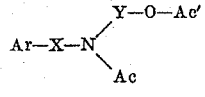

where Ar is a member selected from the group consisting of (A) phenyl radicals having from one to three substituents selected from the group consisting of halo, lower alkoxy, lower alkyl, lower alkylmercapto, lower alkyl-sulfonyl, nitro and di(lower alkyl)amino, and (B) naphthyl, biphenylyl, furyl, pyridyl and thienyl radicals; X is a lower alkylene radical having one to four carbon atoms; Y is a lower alkylene radical having two to six carbon atoms and having its two free valence bonds on different carbon atoms; Ac′ is a carboxylic acyl group having from one to eight carbon atoms; and Ac is a 2,2-dihaloalkanoyl radical having two to four carbon atoms; which comprises reacting a compound having the formula

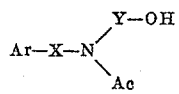

with an acylating agent selected from the group consisting of Ac′-halogen, (Ac′)₂O and formic acid.

19. A process for the preparation of N-(2,4-dichlorobenzyl) - N - (2 - trichloroacetoxyethyl)dichloroacetamide which comprises reacting N-(2,4-dichlorobenzyl)-N-(2-hydroxyethyl)dichloroacetamide with trichloroacetyl chloride.

20. A process for the preparation of N-(2,4-dichlorobenzyl) - N - (2 - chloroacetoxyethyl)dichloroacetamide which comprises reacting N-(2,4-dichlorobenzyl)-N-(2-hydroxyethyl)dichloroacetamide with chloroacetyl chloride.

21. A process for the preparation of N-(2,4-dichlorobenzyl) - N - [2 - (3 - chloropropanoyloxy)ethyl]dichloroacetamide which comprises reacting N-(2,4-dichlorobenzyl)-N-(2-hydroxyethyl)dichloroacetamide with 3-chloropropanoyl chloride.

22. A process for the preparation of N-(2,4-dichlorobenzyl) - N - [2 - (n - butanoyloxy)ethyl]dichloroacetamide which comprises reacting N-(2,4-dichlorobenzyl)-N-(2-hydroxyethyl)dichloroacetamide with n-butanoic anhydride.

23. A process for the preparation of N-(2,4-dichlorobenzyl) - N - [2 - (2,4 - dichlorobenzoxy)ethyl]dichloroacetamide which comprises reacting N-(2,4-dichlorobenzyl)-N-(2-hydroxyethyl)dichloroacetamide with 2,4-dichlorobenzoyl chloride.

24. A process for the preparation of N-(2,4-dichlorobenzyl)-N-(2-formyloxyethyl)dichloroacetamide which comprises reacting N-(2,4-dichlorobenzyl)-N-(2-hydroxyethyl)dichloroacetamide with formic acid.

25. A process for the preparation of N-(4-isopropylbenzyl) - N - (2 - dichloroacetoxyethyl)dichloroacetamide which comprises reacting N-(4-isopropylbenzyl)-N-(2-hydroxyethyl)dichloroacetamide with dichloroacetyl chloride.

26. A process for the preparation of N-(4-isopropylbenzyl) - N - [2 - (n - butanoyloxy)ethyl]dichloroacetamide which comprises reacting N-(4-isopropylbenzyl)-N-(2-hydroxyethyl)dichloroacetamide with n-butanoic anhydride.

27. A process for the preparation of N-(4-isopropylbenzyl)-N-(2-formyloxyethyl)dichloroacetamide which comprises reacting N-(4-isopropylbenzyl)-N-(2-hydroxyethyl)dichloroacetamide with formic acid.

28. A process for the preparation of N-(4-n-butoxybenzyl)-N-(2-formyloxyethyl)dichloroacetamide which comprises reacting N-(4-n-butoxybenzyl)-N-(2-hydroxyethyl)dichloroacetamide with formic acid.

References Cited in the file of this patent
UNITED STATES PATENTS 2,231,905 Hanford et al. _____ Feb. 18, 1941
2,290,881 Katzman _____ July 28, 1942

OTHER REFERENCES

Mannich et al.: Archiv. der Pharmazie 250, 546 (1912).